United States Patent
Francis et al.

(10) Patent No.: US 7,412,699 B2
(45) Date of Patent: Aug. 12, 2008

(54) USING BEHAVIORAL ANNOTATIONS IN SOURCE CODE TO BUILD MIDDLEWARE APPLICATIONS

(75) Inventors: Timothy Marc Francis, Newmarket (CA); Jason Robert McGee, Apex, NC (US); Michael John Morton, Cary, NC (US); Lawrence Scott Rich, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 895 days.

(21) Appl. No.: 10/824,292

(22) Filed: Apr. 14, 2004

(65) Prior Publication Data

US 2005/0235247 A1 Oct. 20, 2005

(51) Int. Cl.
*G06F 9/45* (2006.01)
(52) U.S. Cl. ...................................................... 717/158
(58) Field of Classification Search .................. 717/158, 717/115

See application file for complete search history.

(56) References Cited

U.S. PATENT DOCUMENTS

| | | | |
|---|---|---|---|
| 6,353,896 B1 | 3/2002 | Holzmann et al. | 714/38 |
| 6,691,301 B2 | 2/2004 | Bowen | 717/114 |
| 7,222,333 B1 * | 5/2007 | Mor et al. | 717/115 |
| 7,249,345 B2 * | 7/2007 | Zorc | 717/106 |
| 2003/0078949 A1 * | 4/2003 | Scholz et al. | 707/505 |
| 2003/0225774 A1 * | 12/2003 | Davidov et al. | 707/100 |
| 2003/0229885 A1 * | 12/2003 | Gownder et al. | 717/115 |

OTHER PUBLICATIONS

Keeney, J., "Chisel: a policy driven, context-aware, dynamic adaptation framework," Proceedings Policy 2003. IEEE 4th International Workshop on Policies for Distributed Systems and Network, pp. 3-14, 2003.

* cited by examiner

*Primary Examiner*—John Chavis
(74) *Attorney, Agent, or Firm*—Bruce Clay; Rudolf O. Siegesmund; Gordon & Rees LLP

(57) ABSTRACT

A method for embedding behavior tags in a source code so that a computer can choose the appropriate implementation technology to execute the source code comprising a Configuration Program (CP) and a Deployment Program (DP). The CP allows a user to define and modify a plurality of behavior tags in the behavior tag definitions. The CP also allows the user to define and modify the preferences as to the implementation technologies in an implementation technology preference list. The user then creates the source code with embedded behavior tags. The DP reads the source code and automatically selects the appropriate implementation technology based on the behavior tags. The DP gives preference to implementation technologies according to the implementation technology preference list. The result is that the user does not have to specify the implementation technology for the source code or configure the behavior tags to a specific implementation technology.

34 Claims, 3 Drawing Sheets

| 122 | 124 |
|---|---|
| Behavior Tag | Definition |
| @Remoteable | Logic is able to be invoked outside of current process or network |
| @Concurrent | Logic is able to be called multiple times simultaneously |

| 142 | 144 |
|---|---|
| Preference | Implementation Technology |
| 1 | J2EE |
| 2 | Web Services |
| 3 | .Net Components |

USING BEHAVIORAL ANNOTATIONS IN SOURCE CODE TO BUILD MIDDLEWARE APPLICATIONS

FIELD OF THE INVENTION

The present invention is directed at a method for embedding tags in the source code for a middleware application so that a computer can select an appropriate implementation technology for the source code.

BACKGROUND OF THE INVENTION

Software developers (developers) build middleware applications (applications) to enable computers to communicate with one another and perform desired tasks. When building a middleware application, a developer must choose an implementation technology to use to execute the application. Possible implementation technologies include JAVA 2 ENTERPRISE EDITION™ (J2EE ®), WEB SERVICES™, JAVABEANS™, and MICROSOFT®.NET®. Persons of ordinary skill in the art are aware of implementation technologies other than those listed above. Each implementation technology defines specific constructs and metadata that control the behavior and features of the application. In other words, each implementation technology contains features that make that implementation technology useful in specific situations. Thus, a developer must be familiar with the various features offered by each implementation technology in order to make an informed decision regarding which implementation technology to use to execute the application. Moreover, once a developer has tailored his source code to a particular implementation technology, he is locked into that implementation technology.

As the various implementation technologies have become increasingly sophisticated, the different implementation technologies have begun to offer similar functionality. Today, almost all of the implementation technologies have been expanded to include the features most commonly used by developers. Examples of these common functions include the ability of the implementation technology to be transactional, secure, remotely accessible, and auditable. Even though the various implementation technologies offer similar features, each implementation technology expresses these common functions in different ways. Thus, a developer has more options in selecting an implementation technology with the desired features, but the developer still must understand how to implement the features in the selected implementation technology.

Because many of the implementation technology features are the same, the developer can select any one of a plurality of implementation technologies to execute the application. Thus, the features offered by an implementation technology should no longer be the driving factor behind the selection of a particular implementation technology. The selection of an implementation technology to execute an application should instead be focused on the business logic of the application by allowing a developer to specify the desired functionality and have the implementation technology automatically selected based on the developer's specification. Therefore, a need exists for a method for allowing a developer to create an application in which the implementation technology is automatically selected for the developer based on the desired functionality specified by the developer.

The size of the source code required to create the applications has grown as the demand for more powerful applications has increased. Likewise, companies have to spend large amounts of money developing the source code for these applications. In order to recuperate the expenses associated with developing the source code, companies have created source code that is applicable to a variety of different purposes. As such, the source code may need to be executed using a variety of different implementation technologies. Currently, a developer specifies the functionality desired in an application in a manner specific to the implementation technology. The source code will have to be implementation technology independent if the source code is to be seamlessly executed by a plurality of different implementation technologies. Consequently, a need exists for a method for allowing a developer to specify the desired functionality in an application that is independent of a specific type of implementation technology so that the application source code can be executed by a plurality of implementation technologies.

SUMMARY OF THE INVENTION

The present invention, which meets the needs identified above, is a method for embedding behavior tags in a source code so that a computer can choose the appropriate implementation technology to execute the source code. The software embodiment of the present invention comprises a Configuration Program (CP) and a Deployment Program (DP). The CP allows a user to define and modify a plurality of behavior tags in the behavior tag definitions. The CP also allows the user to define and modify the preferences as to the implementation technologies in an implementation technology preference list. The user may then create the source code and embed the behavior tags in the source code. The DP reads the source code and automatically selects the appropriate implementation technology based on the behavior tags. The DP gives preference to implementation technologies according to the implementation technology preference list. The result is that the user does not have to specify the implementation technology for the source code or configure the behavior tags to a specific implementation technology. Instead, the DP selects the appropriate implementation technology based on the behavior tags in the source code.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 4 is an illustration of the behavior tag definitions of the present invention;

FIG. 5 is an illustration of the implementation technology preference list of the present invention.

DETAILED DESCRIPTION OF THE PREFERRED EMBODIMENT

As used herein, the term "auditable" shall mean the ability to create a record of the parties and/or applications that invoke a source code section.

As used herein, the term "behavior tag" shall mean a tag that is embedded in a source code and that states the properties and/or attributes required of the output file that is created when the source code is executed.

As used herein, the term "behavior tag definition" shall mean a table listing a plurality of behavior tags and the property or attribute required in the output file that results when the source code is executed.

As used herein, the term "computer" shall mean a machine having a processor, a memory, and an operating system, capable of interaction with a user or other computer, and shall include without limitation firewalls, desktop computers, notebook computers, tablet personal computers, personal digital assistants (PDAs), servers, handheld computers, and similar devices.

As used herein, the term "concurrent" shall mean the ability to invoke a source code section multiple times simultaneously.

As used herein, the term "implementation technology" shall mean a server-side component architecture that executes a source code and produces an output file.

As used herein, the term "implementation technology preference list" shall mean a table listing a plurality of implementation technologies and the preferred order of selecting the implementation technologies.

As used herein, the term "isolatable" shall mean the ability to invoke a source code section in a shared environment on another machine or with other components or applications.

As used herein, the term "remoteable" shall mean the ability to invoke a source code section over a network or outside of a process.

As used herein, the term "securable" shall mean the ability to invoke a source code section in a secure manner, either by encryption or by a party possessing a particular ID or level of authority.

As used herein, the term "transactional" shall mean the ability to invoke a source code section in its entirety or not at all. In other words, the source code section either executes completely or does not execute at all.

Figure 1:
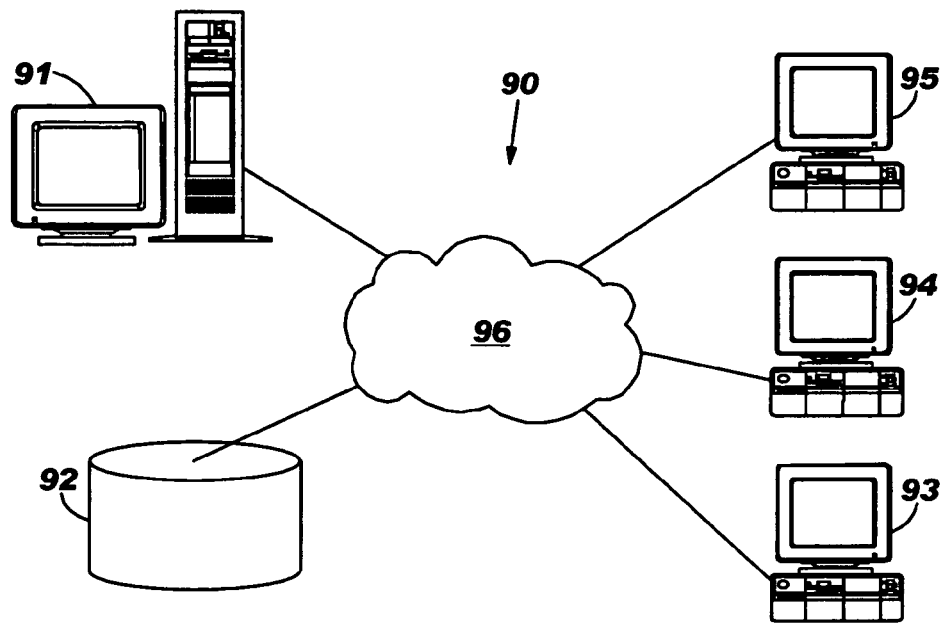
FIG. 1 is an illustration of a computer network used to implement the present invention.

FIG. 1 is an illustration of computer network 90 associated with the present invention. Computer network 90 comprises local computer 95 electrically coupled to network 96. Local computer 95 is electrically coupled to remote computer 94 and remote computer 93 via network 96. Local computer 95 is also electrically coupled to server 91 and database 92 via network 96. Network 96 may be a simplified network connection such as a local area network (LAN) or may be a larger network such as a wide area network (WAN) or the Internet. Furthermore, computer network 90 depicted in FIG. 1 is intended as a representation of a possible operating network containing the present invention and is not meant as an architectural limitation.

Figure 2:
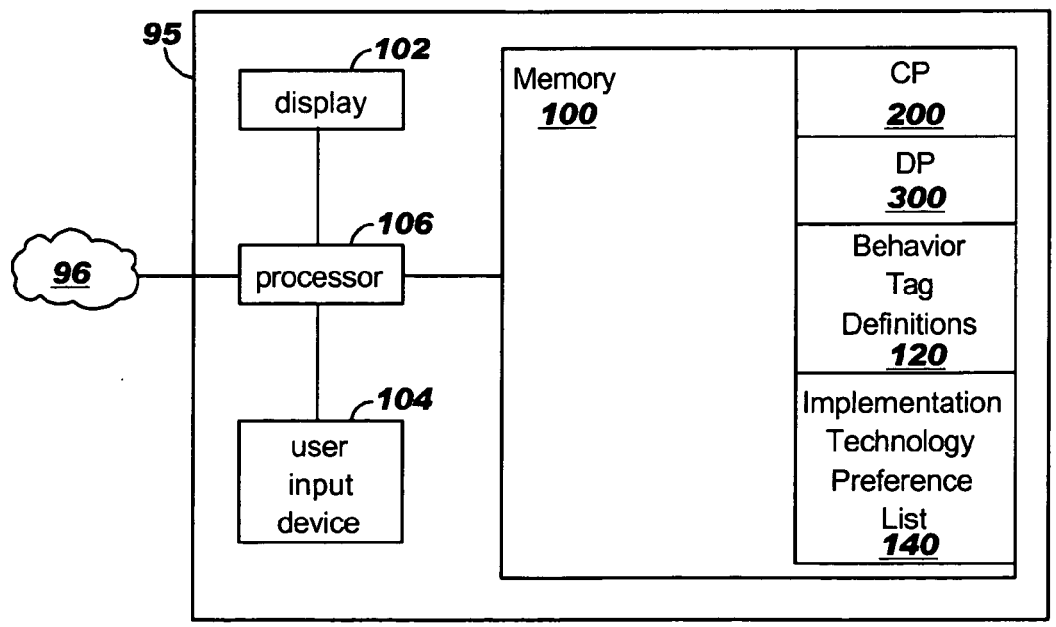
FIG. 2 is an illustration of a computer, including a memory and a processor, associated with the present invention.

The internal configuration of a computer, including connection and orientation of the processor, memory, and input/output devices, is well known in the art. The present invention may be a method, a stand alone computer program, or a plug-in to an existing computer program. Persons of ordinary skill in the art are aware of how to configure computer programs, such as those described herein, to plug into an existing computer program. Referring to FIG. 2, the methodology of the present invention is implemented on software by Configuration Program (CP) 200 and Deployment Program (DP) 300. CP 200 and DP 300 described herein can be stored within the memory of any computers storing the programs depicted in FIG. 3. Alternatively, CP 200 and DP 300 can be stored in an external storage device such as a removable disk, a CD-ROM, or a USB storage device. Memory 100 is illustrative of the memory within the computer of FIG. 1. Memory 100 also contains behavior tag definitions 120 and implementations technology preference list 140. Processor 106 can execute the instructions contained in CP 200 and DP 300. Processor 106 can communicate with other computers via network 96. Processor 106 is also able to display data on display 102 and accept user input on user input device 104. Processor 106, user input device 104, display 102, and memory 100 are part of a computer such as local computer 95 in FIG. 1.

Behavior tag definitions 120 is a computer file that contains a list of behavior tags and the action or property associated with each behavior tag. An example of behavior tag definitions 120 is illustrated in FIG. 4. Implementation technology preference list 140 is a computer file that contains a list of implementation technologies that may be used to implement the source code containing the behavior tags and the order of preference of the implementation technologies. An example of implementation technology preference list 140 is illustrated in FIG. 5.

In alternative embodiments, CP 200, DP 300, behavior tag definitions 120, and/or implementations technology preference list 140 can be stored in the memory of other computers. Storing CP 200, DP 300, behavior tag definitions 120, and/or implementations technology preference list 140 in the memory of other computers allows the processor workload to be distributed across a plurality of processors instead of a single processor. Further configurations of CP 200, DP 300, behavior tag definitions 120, and/or implementations technology preference list 140 across various memories, such as client memory and server memory, are known by persons of ordinary skill in the art.

Figure 3:
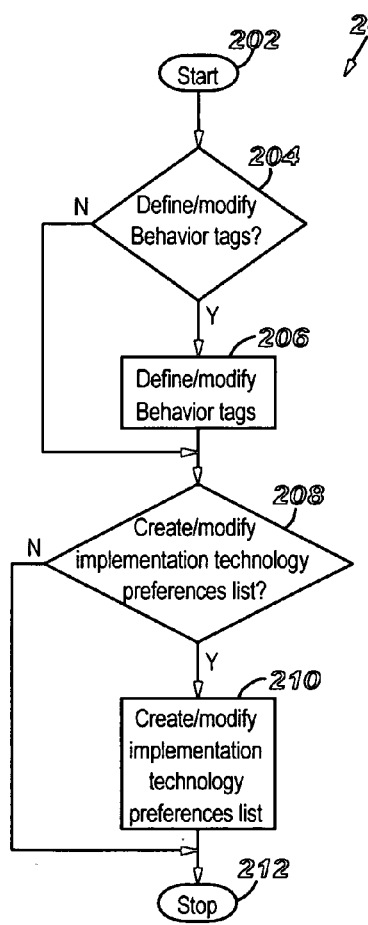
FIG. 3 is an illustration of the logic of the Configuration Program (CP) of the present invention.

FIG. 3 is an illustration of the logic of Configuration Program (CP) 200. CP 200 is a program that allows a user to configure the behavior tags in behavior tag definitions 120 and the implementation technologies in implementation technology preferences list 140. CP 200 starts (202) whenever the user invokes CP 200. CP 200 determines whether the user needs to define or modify the behavior tags in behavior tag definitions 120 (204). If the user does not need to define or modify the behavior tags, CP 200 proceeds to step 208. If the user needs to define or modify the behavior tags, CP 200 allows the user to define or modify the behavior tags in behavior tag definitions 120 (206). In defining the behavior tags, the user adds a new behavior tag and a new definition to behavior tag definitions 120. In modifying the behavior tags, the user changes the behavior tag, the definition, or both in the behavior tag definitions 120. CP 200 then proceeds to step 208.

At step 208, CP 200 determines whether the user needs to define or modify the implementation technologies in implementation technology preferences list 140 (208). If the user does not need to define or modify the implementation technologies, CP 200 proceeds to step 212. If the user needs to define or modify the implementation technologies, CP 200 allows the user to define or modify the implementation technologies in implementation technology list 140 (210). In defining the implementation technologies, the user adds a new preference number and a new implementation technology to implementation technology list 140. In modifying the implementation technologies, the user changes the preference number, the implementation technology, or both in the implementation technology list 140. CP 200 then ends (212).

FIG. 4 is an illustration of behavior tag definitions 120. Behavior tag definitions 120 comprise behavior tags 122 and definitions 124. Behavior tag 122 is a metadata Javadoc tag that is located in the source code and specifies a desired feature. Behavior tag 122 conforms to the standard for Javadoc tags. Persons of ordinary skill in the art will appreciate that behavior tag 122 may also conform to the JSR-175 metadata specification format standard. JSR-175 is a specification that defines a mechanism for specifying metadata tags in the Java language. Persons of ordinary skill in the art will be aware of apparatuses, other than behavior tag 122, that achieve the result claimed by the present invention. Behavior tag 122 is used by DP 300 to select an appropriate implementation technology from implementation technologies list 140. Definition 124 is a description of the property or attribute that the implementation technology must possess. Possible behavior tags include the following: remoteable, transactional, securable, auditable, isolatable, and concurrent. Persons of ordinary skill in the art are aware of behavior tags other than those described herein.

FIG. 5 is an illustration of implementation technology list 140 of the present invention. Implementation technology list 140 comprises preference 142 and implementation technology 144. Preference 142 is a number that defines the user's preference as to implementation technology 144. Implementation technology 144 is the server-side component architecture that executes or processes the source code containing the behavior tags and produces an output file. Possible implementation technologies include JAVA 2 ENTERPRISE EDITION™ (J2EE®), WEB SERVICES™, JAVABEANS®, and MICROSOFT®.NET®. Persons of ordinary skill in the art are aware of implementation technologies other than those described herein. A user may configure implementation technology list 140 such that implementation technology list 140 is a list of all possible implementation technologies arranged in a preferred order, or such that implementation technology list 140 is an exclusive list of implementation technologies that may be used to execute the source code.

When writing the source code, a user embeds the behavior tags into the source code. The behavior tags are generally embedded above the source code section to which the behavior tag applies. DP 300 reads the behavior tags when executing the source code. An example of a source code section containing a behavior tag is shown below:

```
/*
 * @remoteable
 */
public void deposit (account acct, float amount)
{
    acct.balance += amount;
}
```

In the above example, the behavior tag starts with the @ symbol. Persons of ordinary skill in the art will appreciate that any symbol or character combination can precede the behavior tag. During the execution of DP 300, the above source code section might be executed using J2EE® technology. If the source code section is executed using J2EE®, then the result is an ENTERPRISE JAVABEAN® (EJB®) file with a deployment descriptor that is configured with the correct remote interface. If the user changes the implementation technology preferences list 140 and DP 300 is executed again, the above source code might be executed using WEB SERVICES™ technology, which would result in a WSDL file with a deployment descriptor that is configured with the correct remote interface.

Figure 6:
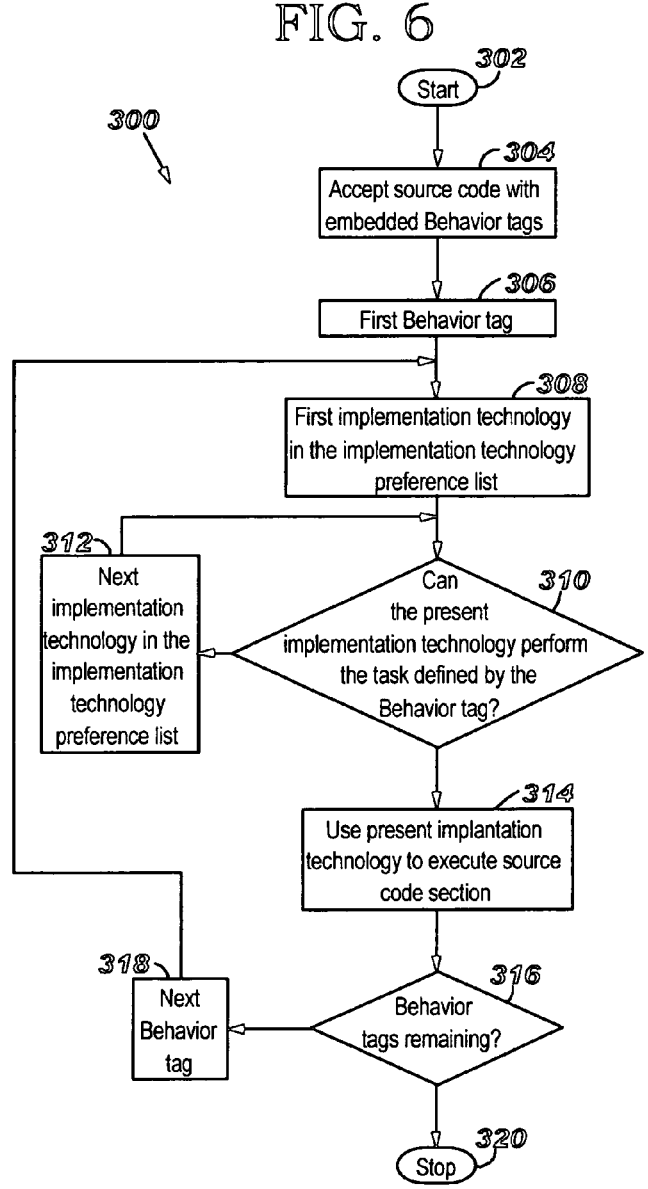
FIG. 6 is an illustration of the logic of the Deployment Program (DP) of the present invention.

FIG. 6 is an illustration of the logic of Deployment Program (DP) 300 of the present invention. DP 300 is a program that accepts a source code containing behavior tags and chooses appropriate implementation technologies for the source code sections. DP 300 starts (302) whenever invoked by the user. DP 300 can be invoked as part of building the application or at runtime on the server. DP 300 then accepts a source code containing at least one embedded behavior tag (304). DP 300 then proceeds to the first behavior tag in the source code (306) and the first implementation technology in implementation technology preference list 140 (308). DP 300 then determines whether the present implementation technology can perform the task defined by the behavior tag (310). In other words, DP 300 determines whether the present implementation technology has the ability to execute the task or generate an output file that has the properties or attributes defined in behavior tag definitions 120.

Returning to step 310, if the present implementation technology cannot perform the task defined by the behavior tag, then DP 300 proceeds to the next implementation technology in implementation technology preference list 140 (312) and returns to step 310. If at step 310 the present implementation technology can perform the task defined by the behavior tag, then DP 300 uses the present implementation technology to execute the source code section following the behavior tag (314). In executing the source code, the implementation technology may have to create one or more artifacts to produce the desired output file(s). Persons of ordinary skill in the art are aware of the artifacts that the implementation technology would create in executing a source code with behavior tags. DP 300 then determines if there are behavior tags remaining (316). If there are behavior tags remaining, then DP 300 proceeds to the next behavior tag (318) and returns to step 308. If at step 316 there are not any behavior tags remaining, then DP 300 ends (320).

While a source code comprising many source code sections can be executed using various implementation technologies, persons of ordinary skill in the art will appreciate that a user may prefer that the entire source code to be executed by as few implementation technologies as is possible. If a user prefers that the entire source code to be executed by as few implementation technologies as is possible, then DP 300 can be configured with additional steps that analyze the implementation technologies that can be used to execute every code section, and choose the implementation technology that can execute every source code section as required by the behavior tags. If a single implementation technology cannot execute every source code section as required by the behavior tags, the DP 300 would select the fewest number of implementation technologies needed to execute the source code as required by the behavior tags. Persons of ordinary skill in the art are aware of how to modify DP 300 to determine the fewest number of implementation technologies required to execute the source code as required by the behavior tags.

While DP 300 is described in terms of a single behavior tag per source code section, persons of ordinary skill in the art will also appreciate that any of the source code sections could be configured with multiple behavior tags. If a source code section contains multiple behavior tags, then DP 300 would have to be modified to ensure that the selected implementation technology would perform the tasks defined by the behavior tag. Persons of ordinary skill in the art are aware of how to modify DP 300 to determine the appropriate implementation technology when the source code contains multiple behavior tags.

An example of a source code section containing multiple behavior tags is shown below:

```
/*
 * @remoteable
 * @transactional policy=required
 */
public void deposit (account acct, float amount)
{
    acct.balance += amount;
}
```

During the execution of DP 300, the above source code section might be executed using J2EE® technology. If the source code section is executed using J2EE®, then the result is an EJB® file with a deployment descriptor that is configured with the correct transaction attributes and remote interface. If the user changes the implementation technology preferences list 140 and DP 300 is executed again, the above source code might be executed using WEB SERVICES™ technology, which would result in a WSDL file with a deployment descriptor that is configured with the correct WS-TX transaction attributes and remote interface.

With respect to the above description, it is to be realized that the optimum dimensional relationships for the parts of the invention, to include variations in size, materials, shape, form, function, manner of operation, assembly, and use are deemed readily apparent and obvious to one of ordinary skill in the art. The present invention encompasses all equivalent relationships to those illustrated in the drawings and described in the specification. The novel spirit of the present invention is still embodied by reordering or deleting some of the steps contained in this disclosure. The spirit of the invention is not meant to be limited in any way except by proper construction of the following claims.

What is claimed is:

1. A method for specifying a desired feature in a source code by embedding a behavior tag in the source code and automatically selecting an implementation technology based on the desired feature associated with the behavior tag.

2. The method of claim 1 comprising:
   installing a deployment program on a computer;
   wherein the deployment program instructs a processor to perform steps comprising:
      determining whether the implementation technology contains the desired feature defined by the behavior tag; and
      responsive to the determination that the implementation technology contains the desired feature defined by the behavior tag, using the implementation technology to execute the source code section associated with the behavior tag.

3. The method of claim 2 wherein the deployment program further comprises:
   responsive to the determination that the implementation technology does not contain the desired feature defined by the behavior tag, selecting a new implementation technology and repeating the steps in claim 2.

4. The method of claim 3 wherein the deployment program further comprises:
   accepting the source code containing the behavior tag.

5. The method of claim 4 wherein the deployment program uses a behavior tag definition to determine whether the implementation technology contains the desired feature defined by the behavior tag.

6. The method of claim 5 wherein the deployment program further comprises:
   wherein the implementation technology is one of a plurality of implementation technologies in an implementation technology preference list; and
   wherein the implementation technology in the implementation technology preference list that contains the desired feature defined by the behavior tag and that has the highest preference is used to execute the source code section associated with the behavior tag.

7. The method of claim 6 wherein the deployment program further comprises:
   a configuration program; and
   wherein the configuration program allows a user to create and modify the behavior tag in the behavior tag definition.

8. The method of claim 7 the deployment program further comprises:
   wherein the configuration program allows a user to create and modify the implementation technology preference in the implementation technology preference list.

9. The method of claim 8 wherein the desired feature is that the source code is remotable.

10. The method of claim 8 wherein the desired feature is that the source code is transactional.

11. The method of claim 8 wherein the desired feature is that the source code is securable.

12. The method of claim 8 wherein the desired feature is that the source code is auditable.

13. The method of claim 8 wherein the desired feature is that the source code is isolatable.

14. The method of claim 8 wherein the desired feature is that the source code is concurrent.

15. A program product for specifying a desired feature in a source code by embedding a behavior tag in the source code and automatically selecting an implementation technology based on the desired feature associated with the behavior tag, the program product comprising:
   a memory;
   wherein the memory comprises instructions for a computer to perform steps comprising:
      determining whether the implementation technology contains the desired feature defined by the behavior tag; and
      responsive to the determination that the implementation technology contains the desired feature defined by the behavior tag, using the implementation technology to execute the source code section associated with the behavior tag.

16. The program product of claim 15 further comprising:
   responsive to the determination that the implementation technology does not contain the desired feature defined by the behavior tag, selecting a new implementation technology and repeating the steps in claim 15.

17. The program product of claim 15 further comprising:
   accepting the source code containing the behavior tag.

18. The program product of claim 15 wherein the deployment program uses a behavior tag definition to determine whether the implementation technology contains the desired feature defined by the behavior tag.

19. The program product of claim 15 further comprising:
wherein the implementation technology is one of a plurality of implementation technologies in an implementation technology preference list; and
wherein the implementation technology that contains the desired feature defined by the behavior tag and that has the highest preference is used to execute the source code section associated with the behavior tag.

20. The program product of claim 15 further comprising:
a configuration program; and
wherein the configuration program allows a user to create and modify the behavior tag in the behavior tag definition.

21. The program product of claim 15 the deployment program further comprises:
wherein the configuration program allows a user to create and modify the implementation technology preference in the implementation technology preference list.

22. The program product of claim 15 wherein the desired feature is that the source code is remotable.

23. The program product of claim 15 wherein the desired feature is that the source code is transactional.

24. The program product of claim 15 wherein the desired feature is that the source code is securable.

25. The program product of claim 15 wherein the desired feature is that the source code is auditable.

26. The program product of claim 15 wherein the desired feature is that the source code is isolatable.

27. The program product of claim 15 wherein the desired feature is that the source code is concurrent.

28. The apparatus of claim 15 wherein the desired feature is that the source code is remotable.

29. The apparatus of claim 15 wherein the desired feature is that the source code is transactional.

30. The apparatus of claim 15 wherein the desired feature is that the source code is securable.

31. The apparatus of claim 15 wherein the desired feature is that the source code is auditable.

32. The apparatus of claim 15 wherein the desired feature is that the source code is isolatable.

33. The apparatus of claim 15 wherein the desired feature is that the source code is concurrent.

34. An apparatus for specifying a desired feature in a source code by embedding a behavior tag in the source code and automatically selecting an implementation technology based on the desired feature associated with the behavior tag, the apparatus comprising:
means for accepting the source code containing the behavior tag;
means for determining whether the implementation technology contains the desired feature defined by the behavior tag;
responsive to the determination that the implementation technology does not contain the desired feature defined by the behavior tag, means for selecting a new implementation technology and repeating the above step;
responsive to the determination that the implementation technology contains the desired feature defined by the behavior tag, means for using the implementation technology to execute the source code section associated with the behavior tag;
wherein the deployment program uses a behavior tag definition to determine whether the implementation technology contains the desired feature defined by the behavior tag;
wherein the implementation technology is one of a plurality of implementation technologies in an implementation technology preference list;
wherein the implementation technology that contains the desired feature defined by the behavior tag and that has the highest preference is used to execute the source code section associated with the behavior tag;
a configuration program;
wherein the configuration program allows a user to create and modify the behavior tag in the behavior tag definition; and
wherein the configuration program allows a user to create and modify the implementation technology preference in the implementation technology preference list.

* * * * *